UNITED STATES PATENT OFFICE.

HENRY DREYFUS, OF LONDON, ENGLAND.

MANUFACTURE OF ACETIC ANHYDRID.

1,338,979.  Specification of Letters Patent.  Patented May 4, 1920.

No Drawing.  Application filed February 4, 1919. Serial No. 275,005.

*To all whom it may concern:*

Be it known that I, HENRY DREYFUS, of London, England, have invented certain new and useful Improvements in the Manufacture of Acetic Anhydrid, of which the following is a specification.

This invention relates to the manufacture of acetic anhydrid by a process according to my previous U. S. Patent No. 1,283,115 dated October 29, 1918 wherein sulfuric anhydrid is introduced into a dry salt or salts of acetic acid, such as acetate of sodium or of calcium, mixed with liquid acetic anhydrid.

Although sulfuric anhydrid can be used for the purpose of said reaction, it has been found that the employment of the sulfuric anhydrid directly as such presents difficulties in manufacturing working, inasmuch as sulfuric anhydrid is a substance which melts at about 15° C. and boils at about 45° C.

To secure a good reaction for the manufacture of acetic anhydrid by the process referred to, the mixture of sodium acetate or other acetate and acetic anhydrid into which the sulfuric anhydrid is introduced, has to be maintained at a low temperature. Owing to its solidifying point, however, sulfuric anhydrid itself requires to be at a higher temperature than is suitable for the reaction, in order to be introduced, and at such higher temperature it can act to decompose acetic anhydrid and form sulfoacetic compounds.

I have found that this difficulty can be overcome if the sulfuric anhydrid is diluted with indifferent gases, *i. e.* such as do not interfere with the reaction, so that the sulfuric anhydrid in its mixture with the indifferent gas or gases can be cooled down to the necessary low temperatures for the reaction, without solidifying, for example below about 0° C., say temperatures between about 0° C. and about minus 20° C. In this way the gaseous mixture can be cooled down to these low temperatures before introduction into the reaction vessel containing the mixture of sodium acetate or other acetate and acetic anhydrid, likewise cooled down to a similar low temperature.

Of particular importance for the manufacture on a large scale is the application or employment therefor of the gaseous current which is produced in the manufacture of sulfuric anhydrid by the contact process. The sulfuric anhydrid contained in this current, which consists of sulfuric anhydrid, nitrogen and some oxygen, is so much diluted that the sulfuric anhydrid will not solidify, but remains in gaseous or vapor form and can be cooled down to between 0° C. and minus 20° C. before introduction into the mixture of sodium acetate or other acetate and acetic anhydrid.

By working with diluted sulfuric anhydrid as before mentioned, the $SO_3$ gas absorbed at the low temperature immediately gives the formation of acetic anhydrid without the sulfuric anhydrid combining with the $CH_3$ group of the acetic anhydrid or of any acetic acid which may be present or which may be produced in the reaction.

The remaining gases, such as nitrogen and the small quantity of oxygen which is usually still present in the gaseous current which comes from $SO_3$ contact chambers, pass away from the reaction vessel, and any small portions of acetic anhydrid which they may carry with them may be retained by a suitable condenser connected to the gas outlet, leaving the nitrogen and a little oxygen.

The reaction takes place according to the following equation:—

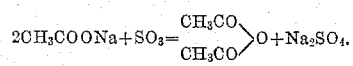

When about the theoretical quantity of sulfuric anhydrid has been introduced, the acetic anhydrid formed can be distilled off.

Example: Into a vessel provided with a gas outlet and with a good stirrer of any form, and containing a mixture of 164 kilos of acetate of sodium (or the corresponding quantity of another acetate salt) and 250 kilos of acetic anhydrid, after this mixture has been cooled down to between 0° and minus 20° C., is introduced the gaseous current from a contact apparatus for sulfuric anhydrid manufacture, this current being cooled to a temperature of about 0° to minus 20° C. before introduction into the mixture of acetate salt and acetic anhydrid in the reaction vessel. The sulfuric anhydrid is absorbed and the remaining gases are led off through a condenser to retain any traces of acetic anhydrid which they may contain. During the introduction strong stirring is maintained and the temperature in the reaction vessel is kept down by cooling at the low temperature mentioned. When about 80 kilos of sulfuric anhydrid have been thus introduced, the introduction is stopped and the acetic anhydrid formed is distilled off in the same apparatus or in another apparatus.

A very high yield of acetic anhydrid can be obtained.

What I claim and desire to secure by Letters Patent is:

1. In a process for the manufacture of acetic anhydrid wherein gaseous sulfuric anhydrid is brought into a reaction mixture of low temperature, containing a dry acetate and acetic anhydrid, the step of introducing the gaseous sulfuric anhydrid in admixture with an indifferent gaseous diluent into the reaction mixture, whereby the gaseous sulfuric anhydrid can be cooled down to low temperatures for the reaction.

2. In a process for the manufacture of acetic anhydrid wherein gaseous sulfuric anhydrid is brought into a reaction mixture of low temperature containing dry sodium acetate and acetic anhydrid, the step of introducing the gaseous sulfuric anhydrid in admixture with an indifferent gaseous diluent into the reaction mixture, whereby the gaseous sulfuric anhydrid can be cooled down to low temperatures for the reaction.

3. In a process for the manufacture of acetic anhydrid wherein gaseous sulfuric anhydrid is brought into a reaction mixture containing a dry acetate and acetic anhydrid maintained at about 0° to about minus 20° C., the step of introducing the gaseous sulfuric anhydrid in admixture with an indifferent gaseous diluent into the reaction mixture, while such gaseous mixture is cooled to a low temperature.

4. In a process for the manufacture of acetic anhydrid wherein gaseous sulfuric anhydrid is brought into an agitated reaction mixture containing dry sodium acetate and acetic anhydrid maintained at about 0° to about minus 20° C., the step of introducing the gaseous sulfuric anhydrid in admixture with an indifferent gaseous diluent into the reaction mixture, while the said gaseous mixture is at a temperature of about 0° to about minus 20° C.

5. In a process for the manufacture of acetic anhydrid wherein gaseous sulfuric anhydrid is brought into a reaction mixture of low temperature containing a dry acetate and acetic anhydrid, the step of introducing into the reaction mixture a cooled gaseous mixture obtained in the production of sulfuric anhydrid by the contact process, containing sulfuric anhydrid and nitrogen.

6. In a process for the manufacture of acetic anhydrid wherein gaseous sulfuric anhydrid is brought into a reaction mixture containing dry sodium acetate and acetic anhydrid maintained at about 0° to about minus 20° C., the step of introducing into the reaction mixture a gaseous mixture, containing sulfuric anhydrid and nitrogen, obtained in the production of sulfuric anhydrid by the contact process, while said gaseous mixture is at a low temperature.

In testimony whereof I have hereunto subscribed my name.

HENRY DREYFUS.